United States Patent [19]

Marin

[11] Patent Number: 4,730,268

[45] Date of Patent: Mar. 8, 1988

[54] DISTRIBUTED BUS ARBITRATION FOR A MULTIPROCESSOR SYSTEM

[75] Inventor: James S. Marin, Garland, Tex.

[73] Assignee: Texas Instruments Incorporated, Dallas, Tex.

[21] Appl. No.: 728,955

[22] Filed: Apr. 30, 1985

[51] Int. Cl.⁴ .............................................. G06F 9/00
[52] U.S. Cl. .................................................. 364/900
[58] Field of Search ... 364/900 MS File, 200 MS File; 340/825.06, 825.5, 825.18

[56] References Cited

U.S. PATENT DOCUMENTS

| | | | |
|---|---|---|---|
| 4,096,572 | 6/1978 | Namimoto | 364/200 |
| 4,148,011 | 4/1979 | McLagan et al. | 364/900 |
| 4,268,904 | 5/1981 | Suzuki et al. | 364/200 |
| 4,374,413 | 2/1983 | Comfort et al. | 364/200 |
| 4,376,975 | 3/1983 | Comfort et al. | 364/200 |
| 4,400,771 | 8/1983 | Suzuki et al. | 364/200 |
| 4,646,232 | 2/1987 | Chang et al. | 364/200 |
| 4,660,169 | 4/1987 | Norgren et al. | 364/900 |

*Primary Examiner*—Thomas M. Heckler
*Assistant Examiner*—John G. Mills, III
*Attorney, Agent, or Firm*—Kenneth C. Hill; James T. Comfort; Melvin Sharp

[57] ABSTRACT

A computer system has a plurality of processors sharing a bus. Bus arbitration circuitry is located on each processor for determining bus access. The identity of the processor which is responsible for arbitrating bus access changes from time to time. Each processor has a plurality of possible arbitration states, which are controllable through execution of software by the processor.

8 Claims, 4 Drawing Figures

DISTRIBUTED BUS ARBITRATION FOR A MULTIPROCESSOR SYSTEM

BACKGROUND AND SUMMARY OF THE INVENTION

The present invention relates to an improved arbitration control scheme for a multi-processor computer system.

In a system with multiple processors accessing a shared bus, some form of bus access protocol is necessary. Current arbitration schemes for determining bus access utilize a single separate arbitration controller attached to the bus. This arbitration controller is synchronous with the system clock, often resulting in wasted clock cycles while the arbitration controller is determining which processor shall have access to the bus. In addition, such schemes for determining access operate generally on a fixed priority basis. That is, the priority of the various processors cannot be changed, with the common result that low priority processors do not receive the necessary bus access cycles.

Additionally, arbitration is not determined every clock cycle. Therefore, a processor which has a high priority and needs bus access, but has a relatively large number of unused single cycles, can prevent a lower priority processor from having bus access.

Thus, prior bus arbitration schemes result in fair bus access being denied to one or more lower priority processors and less than 100% potential bus utilization because of wasted clock cycles which cannot be transferred to other processors on a temporary basis.

Many present arbitration schemes use open-collector outputs for signalling. That is, several outputs are tied together, and a device signals a request for arbitration by pulling the common line or lines to ground. This general procedure has an important drawback for high speed systems, in that the return-to-high state is too slow unless a pull-up resistor is very small. However, if the pull-up resistor is small, high power dissipation results.

It is therefore an object of the present invention for a bus arbitration scheme to spread the arbitration controller function among the various processors. It is a further object of the present invention that arbitration mastership can be passed among the various processors. It is another object of the present invention that bus access can be determined on a cycle by cycle basis, and that bus access grants are separated from transfers of arbitration mastership. It is yet another object of the present invention to provide an arbitration system which does not use open-collectors, thus improving speed.

Therefore, according to the present invention, a bus arbitration scheme uses an asynchronous ring coupled to all processors which can be used to control bus access. One processor is the arbitration controller at any given time and operates in synchronization with the system clock, while the remaining processors operate asynchronously to determine the arbitration controller for the next cycle. Each processor has arbitration control logic incorporated thereto, and has the capability of being the arbitration controller. Arbitration mastership is determined on a cycle by cycle basis, as is bus access. Clock cycles can be granted to other processors as required on a cycle by cycle basis, and arbitration mastership can be circulated among the various processors.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENT

In a multi-processing scheme, some form of arbitration control must determine which processor has access to the data and address buses. In most current implementations, this arbitration controller takes the form of a specially designed chip which has access to various bus signals, and operates synchronously from a system clock. The preferred embodiment of an improved scheme for controlling arbitration between multiple processors is shown in FIG. 1.

Figure 1:
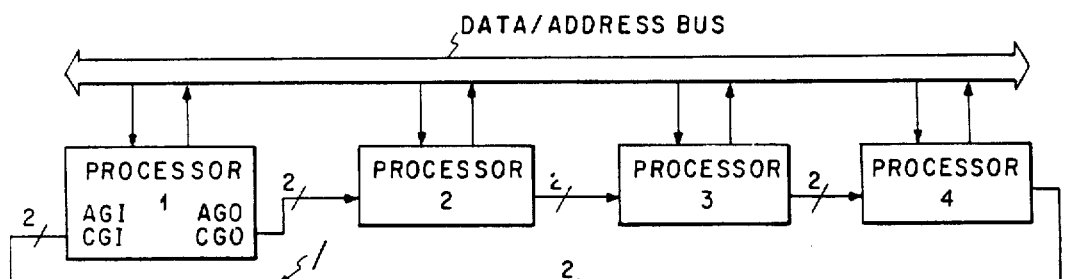
FIG. 1 is a block diagram of a portion of a processing system having four (4) processors, and illustrating a preferred embodiment of the present invention.

The system of FIG. 1 shows four (4) processors bidirectionally connected to a DATA/ADDRESS BUS. The exact natures of the processors is not relevant to the present invention, and they may be any devices which control bus access. For example, each processor can be a microprocessor, a memory management unit, or an I/O controller. Generally, any device which can place an address signal on the bus, and read or write data on the bus, qualifies as a processor needing bus control arbitration. In general, memories, which merely place data on the bus when activated by the correct addressing signals, do not need arbitration controllers.

Arbitration control and bus access signals of FIG. 1 are located in a ring 1 having two signal lines which connects all processors. Each processor has an arbitration control (see FIG. 2) which reads the two (2) incoming signals AGI and CGI, and outputs two (2) appropriate signals AGO and CGO for the next processor in the ring. Arbitration control is passed from processor to processor around the ring, so that each processor will, in its turn, arbitrate for bus access for the following clock cycle. The arbitration signals are asynchronous, so that the control signals will pass completely around the ring in less than one (1) clock cycle. A practical result is that the number of processors which can be coupled together using this arbitration scheme is limited by the clock period and the number of gate delays in the arbitration control for each processor. For example, if a clock cycle is twenty (20) gate delays in duration, and the arbitration control for each processor is four (4) gate delays, a maximum of five (5) processors could be coupled together in this arbitration ring, and four (4) processors may be a maximum practical limit in order to ensure that the asynchronous signals on the line become settled prior to the beginning of the next clock cycle.

The arbitration control function operates separately from the bus access function. Each clock cycle, the processors as a group must decide which will have bus access during the next clock cycle, and which will be the arbitration master during the next cycle. The current arbitration master determines which processor will have bus access next cycle. The current arbitration master may or may not determine which processor will become the arbitration master next cycle, depending on factors to be discussed below. Cycles can be granted to other processors while arbitration mastership is retained.

Figure 2:
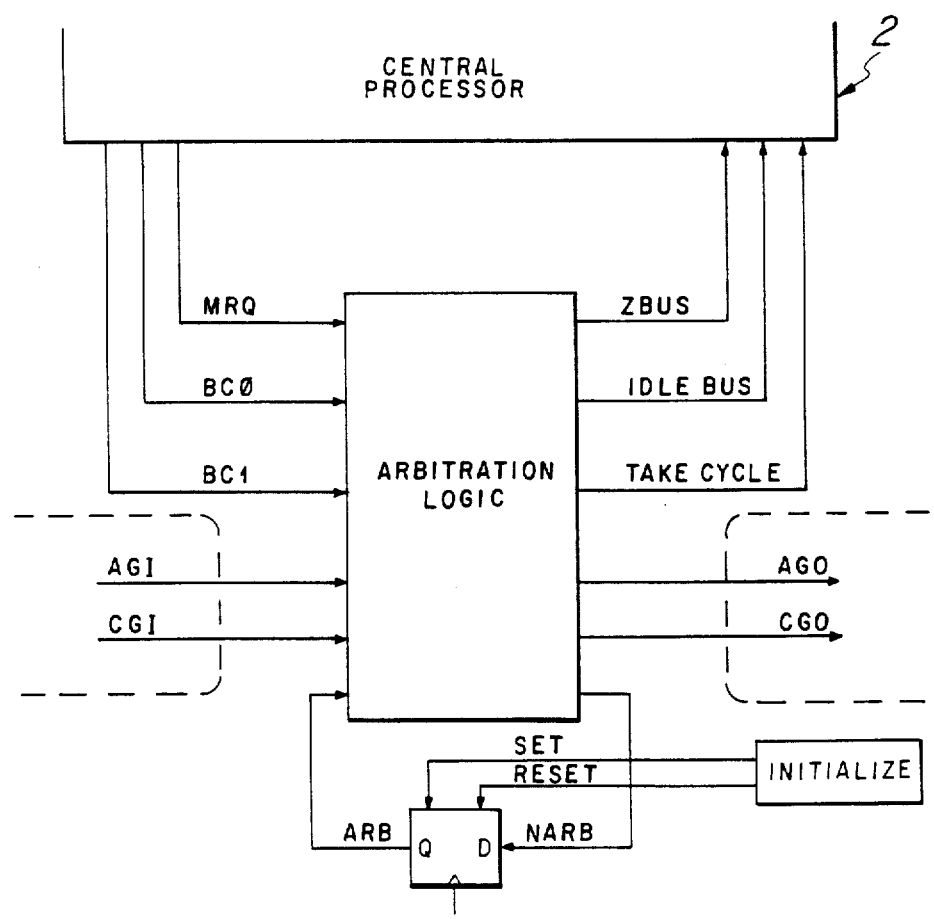
FIG. 2 is a block diagram of an arbitration controller for a single processor of FIG. 1, and showing the control signals associated therewith.

Referring to FIG. 2, the arbitration control portion of the processors is shown. All processors should have, and will be assumed to have, identical arbitration controls. The arbitration control is relatively simple, and can easily be integrated onto a microprocessor or other controller chip.

Referring to FIG. 2, an arbitration control is located on the same chip with its associated central processor 2.

Three (3) signals are output from the processor 2 and coupled into ARBITRATION LOGIC. The first signal is MRQ (Memory ReQuest) which is a signal that the processor 2 desires access to the bus. The signals BC0 and BC1 are a two-bit state register indicating the arbitration state of the processor 2. These two bits are software controllable, so that the arbitration status of the processor 2 can be changed during execution of a program.

Three (3) signals are output from the arbitration logic to the processor 2. ZBUS tells the processor 2 to tri-state (high impedance state) all output buffers for the next clock cycle. The signal IDLE BUS tells the processor 2 to, at the next clock cycle, drive all output buffers into the high impedance state except for certain preselected buffers which the bus requires to be active at all times. This will be explained later in more detail. The signal TAKE CYCLE tells the processor 2 that it has access to the bus for the next cycle, allowing the processor 2 to activate its output buffers. Only one of these signals can be a logical one during each clock cycle.

The signals AGI (Arbitration Grant In) and CGI (Cycle Grant In) are the incoming signals from the two bit arbitration ring 1. AGO (Arbitration Grant Out) and CGO (Cycle Grant Out) are the outgoing lines for the two-bit arbitration ring 1.

The signals ARB (ARBitrate) and NARB (Next cycle ARBitrate) indicate ownership of a one-bit arbitrate token. The signal CK is the system clock.

The block labelled INITIALIZE is used to send either the signal SET or RESET to the D flip-flop. This is used to start the system at power up or after a hardware reset, as will be described below.

In the preferred embodiment, the arbitration control is used in a system in which two bus lines must be driven to a valid state on every clock cycle, regardless of whether or not any devices actually access the bus. Usually, when a processor does not desire, or cannot obtain, bus access, all output buffers are driven into the high impedance state. This happens when the signal ZBUS is a logical one. However, since the bus design requires that some processor drive certain signals into a valid state for each clock cycle, the IDLE BUS signal commands a processor to drive the output buffers associated with such required signals into a preselected valid state. As will be described below, only one processor in the system will generate an active IDLE BUS, with the remaining processors generating a ZBUS signal, whenever no processor desires bus access.

A one-bit token is passed among the processors in the system in order to determine which processor will arbitrate for bus control on the following cycle. Bus access is arbitrated during every clock cycle for the following cycle, and the arbitration may be done by a different processor during each cycle. Thus, the processor which owns the arbitration token on a given cycle will determine which processor has access to the bus for the following cycle. It should be noted that this token determines arbitration mastership only; the processor which is the arbitration master will not necessarily also be the processor which takes control of the bus on the following cycle. Processor access to the bus and arbitration mastership thus circulate independently around the arbitration control ring.

The arbitration control states which a processor can be in are determined by BC0 and BC1, and are defined in Table 1.

TABLE 1

| | ARBITRATION CONTROL STATES | | |
|---|---|---|---|
| STATE | BC0 | BC1 | MEANING |
| LK | 0 | 0 | Lock bus for exclusive access |
| RM | 0 | 1 | Retain arbitration mastership but grant unneeded cycles |
| CM | 1 | 0 | Circulate arbitration mastership |
| CS | 1 | 1 | Cycle steal and don't take arbitration mastership |

The LK state is accomplished by becoming arbitration master and not granting any bus access cycles to other processors. When BC0 and BC1 for a processor indicate a lock state, the processor cannot take any other bus cycles until arbitration mastership is acquired. At that time, the processor locks the bus and gets all bus cycles until its arbitration state is changed. Since no other processors can obtain access to the bus while one processor has locked the bus, the LK state should be used only when required for special control functions such as test-and-set.

The RM state can be used when a time critical section of code is encountered by a processor. As in the LK state, the processor cannot use any bus cycles until arbitration mastership is acquired. At that time, the processor becomes arbitration master and retains that mastership, but can grant unusable cycles to other processors on a cycle-by-cycle basis. A processor in the RM state has the highest priority for bus access and will get as many cycles as it needs. The RM state should be used only when required, since another processor cannot lock the bus if the current arbitration master is in a RM state.

The CM state is used when access is to be uniformely distributed between the several processors. A processor in the CM state that is currently the arbitration controller, signified by possession of the arbitration token, will try to give arbitration mastership away on the following cycle. A processor in the CM state that is not currently arbitration controller will try to become arbitration controller if mastership is offered. If all processors are in the CM state, each processor will arbitrate for bus mastership for an equal length of time. A processor in the CM state will use a bus cycle if it needs one, or can grant it to another processor.

The CS state has the lowest priority for bus access. The arbitration token, if currently held, will be offered. If the processor does not currently hold the arbitration token, it will not accept it when offered. Bus access by a processor in the CS state is taken when cycles are desired (as indicated by MRQ) and are available from another processor. If all processors are in the CS state, then the processor that currently owns the token (and can't give it away because no other processor wants it) will by default retain arbitration mastership. The CM or CS states are used for normal operations, with the LK and RM states used only for exception situations. If all processors are in the CM state, any processor that needs bus access is assured of getting its fair share.

Granting of arbitration mastership is done on the AGI/AGO ring, which is one bit of ring 1. If AGI to a particular processor is a logical one, that processor is being offered arbitration mastership. If the processor is in the LK, RM or CM states, it will take arbitration mastership on the following clock cycle. In that case, a logical zero is output on AGO. If the processor is in the CS state, it will pass the offer of mastership on to the next processor. This is done by driving AGO to a logical one.

If arbitration mastership is offered and accepted, the signal NARB is driven to a logical one. Upon receipt of the next CK signal, the D flip-flop drives signal ARB high, indicating that this processor now has arbitration mastership. If the processor is in an LK or RM state, mastership will now be offered on future cycles, meaning that AGO remains a logical zero. If the processor is in the CM state or is changed on the next cycle to the CM or CS states, arbitration mastership will be offered to other processors by driving AGO to a logical one.

If a processor currently has arbitration mastership, indicated by ARB, the AGO signal will be set. This signal will travel asynchronously around the ring until another processor accepts arbitration mastership. At that point, the other processor will put a zero on the line AGO, which will circulate back to the original processor which gave away arbitration mastership. At that point, AGI will be 0, and NARB will be reset indicating that arbitration mastership will be given up on the following clock cycle. If no other processor accepts mastership, AGI will remain a logical one, indicating that the current processor should retain arbitration mastership regardless of its arbitration control state.

The cycle grant ring, represented by CGI and CGO, is one bit of ring 1, is independent of the arbitration grant ring and is controlled by the processor which currently has arbitration mastership. If the arbitration master needs a clock cycle, CGO is reset to zero, and no other processor can have a bus access cycle. If the current arbitration master does not need the next cycle, CGO is set to one, indicating that the following cycle is free to be taken. This happens when MRQ of the arbitration master is zero. If another processor needs the cycle, CGI to that processor will be one and that processor will reset its CGO to zero. This zero will be passed around the ring back to the arbitration master, which then knows its cycle grant was accepted. If the cycle grant is accepted by another processor, ZBUS is set to one. If the CGI signal to the arbitration master remains one, no other processors in the ring needed the bus cycle, and the signal IDLE BUS in the arbitration master is driven to one so that the special bus signals will be driven to a valid state. If the arbitration master needs the next cycle, MRQ will be one, and TAKE CYCLE will also be set to one.

A processor which is not the arbitration master will always set ZBUS to one unless that processor needs a cycle and the CGI signal is one. In that case, CGO will be set to zero and TAKE CYCLE will be set to one.

Figure 3:
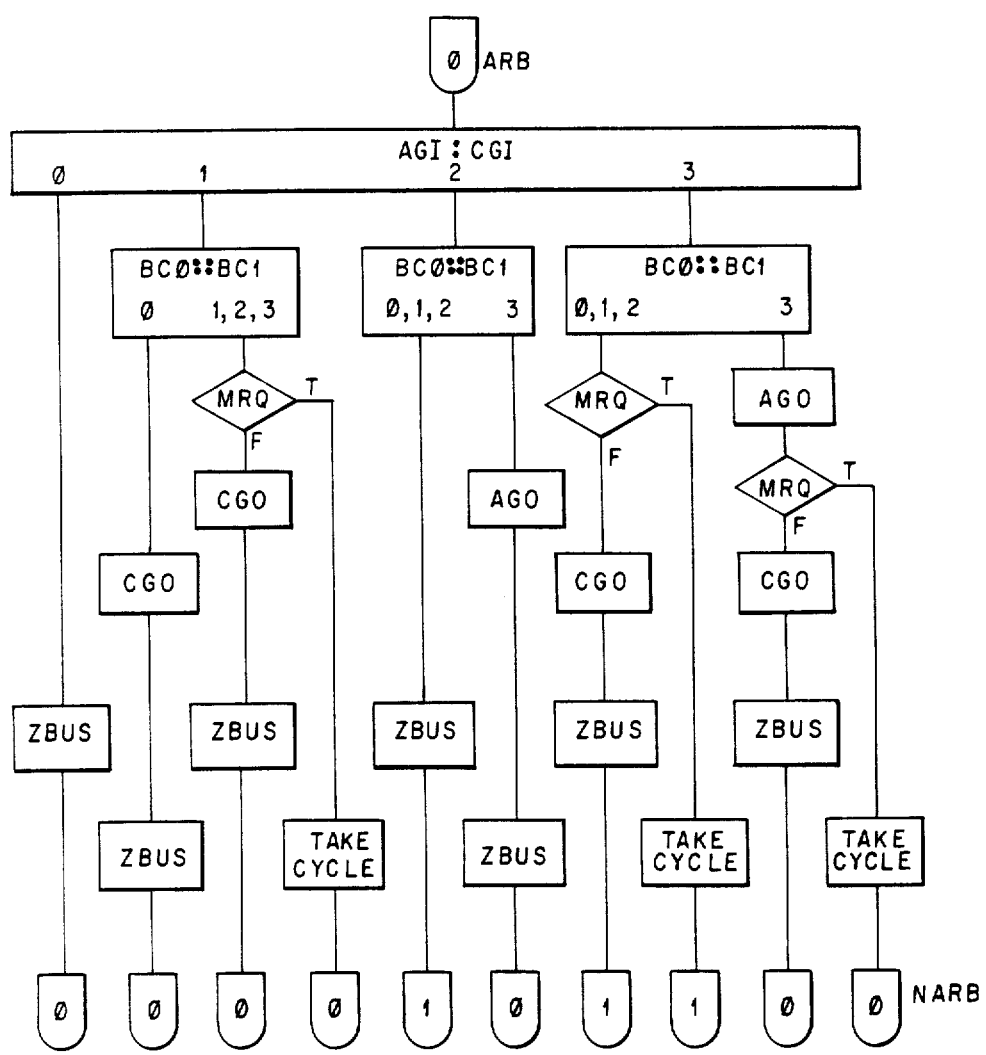
FIGS. 3 and 4 are logic flow diagrams associated with the arbitration controller of FIG. 2.
Figure 4:
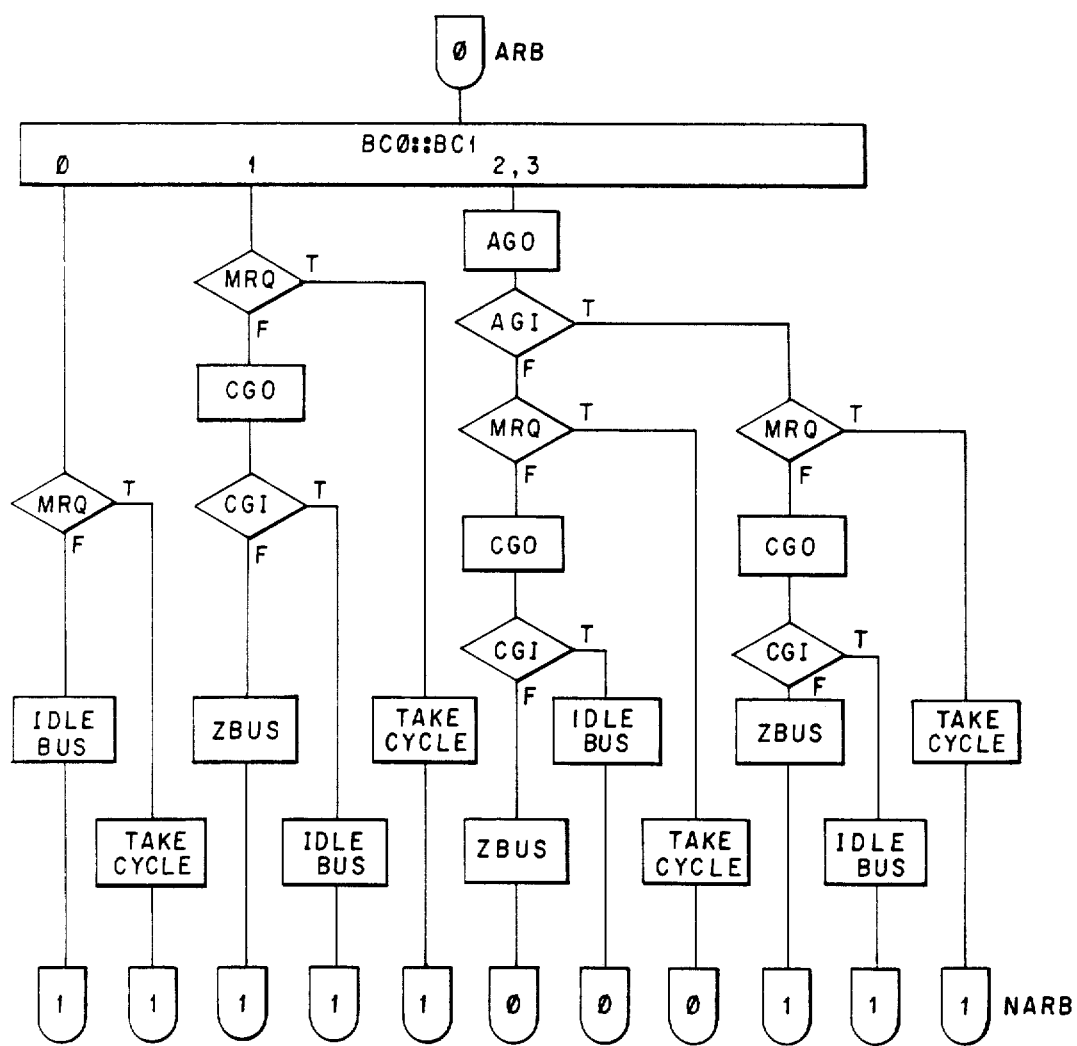

FIGS. 3 and 4 are a flowchart defining all signals which pass through the arbitration circuitry. Referring to FIG. 3, the upper node, labeled ARB, indicates the decisions which must be made by the arbitration logic when a processor does not have the arbitration. It should be noted that the signals ZBUS, IDLE BUS and TAKE CYCLE are mutually exclusive, and that one and only one of these signals must be a logical one for each processor during each clock cycle.

Referring to FIG. 3, if ARB is zero, and AGI and CGI are both zero, ZBUS is set to 1 and NARB is reset to zero. On the next clock cycle, ARB will become equal to NARB, so that the combinational logic will return to the top of FIG. 3 on the next clock cycle. If AGI is zero and CGI is one, the signals to be set depend on the values of BC0 and BC1. If both BC0 and BC1 are zero, CGO and ZBUS are both set, with NARB reset. If either BC0 or BC1 is one and MRQ is one, TAKE CYCLE is set and NARB is reset. If MRQ is zero, CGO is set, thereby passing along the one that entered the processor through CGI, and ZBUS is set. NARB is reset.

If AGI is one and CGI is zero, the action to be taken again depends on the state of BC0 and BC1. If both values are one, AGO is set. ZBUS is set and NARB is reset. In any other case, ZBUS is set and NARB is set. This will result to this processor taking arbitration mastership on the next cycle which will take the logical flowchart to the top of FIG. 4 at the next clock cycle.

In FIG. 3, if AGI and CGI are one, the action to be taken depends, again, on the state of BC0 and BC1. If both signals are one, AGO is set, and TAKE CYCLE is set if MRQ is one. If MRQ is zero, CGO and ZBUS are set. In either case, NARB is reset.

FIG. 4 represents the logical flow diagram when the processor has arbitration mastership. When BC0 and BC1 are both zero, TAKE CYCLE is set if MRQ is one, and IDLE BUS is set if MRQ is zero. In either case, NARB is set. If BC0 is zero and BC1 is one, TAKE CYCLE is set if MRQ is one and CGO is set if MRQ is zero. If MRQ is zero, IDLE BUS is also set if CGI is one, and ZBUS is set if CGI is zero. In all three cases, NARB is set. If BC0 is one, AGO is set. If AGI is one, TAKE CYCLE and NARB are set if MRQ is one. If MRQ is zero, CGO is set and either IDLE BUS or ZBUS is set, depending on the value of CGI. If AGI is zero, TAKE CYCLE is set and NARB reset if MRQ is one. If MRQ is zero, CGO is set and either IDLE BUS or ZBUS is set if depending on the value of CGI. In either case, NARB is set.

These flow diagrams may be translated into boolean logic statements quite simply. Each node which sets a signal is represented by a rectangle in FIGS. 3 and 4. Any nodes not so set are driven to logical zero. The logic situations which lead to the setting of each of these signals can be read directly from FIGS. 3 and 4 and incorporated into a boolean equation.

For example, the signal IDLE BUS can be set by four (4) different logic situations, all of which are shown in FIG. 4. This represents the fact that only the arbitration master may idle the bus. Taking the four set IDLE BUS columns from left to right, the following boolean equations results:

$$\text{IDLE BUS} = \text{ARB} \cdot \overline{\text{BC0}} \cdot \overline{\text{BC1}} \cdot \overline{\text{MRQ}} + \tag{1}$$

$$\text{ARB} \cdot \overline{\text{BC0}} \cdot \text{BC1} \cdot \overline{\text{MRQ}} \cdot \overline{\text{CGI}} +$$

$$\text{ARB} \cdot \text{BC0} \cdot \overline{\text{AGI}} \cdot \overline{\text{MRQ}} \cdot \text{CGI} +$$

-continued $$ARB*BC0*AGI*\overline{MRQ}*CGI$$

Note that this equation indicates that IDLE BUS can be set by the processor having arbitration mastership (indicated by ARB) as described above. This equation can be easily reduced using any of numerous known techniques to the following minimized equation:

$$IDLE\ BUS = ARB*\overline{MRQ}*\overline{BC0}*\overline{BC1} + ARB*\overline{MRQ}*CGI \quad (2)$$

Following the same procedure on all of the possible output signals gives the following set of minimized boolean equations:

$$NARB = \overline{BC0}*AGI + BC1*AGI + ARB*\overline{BC0} + ARB*AGI \quad (3)$$

$$TAKE\ CYCLE = BC1*MRQ*CGI + BC0*MRQ*\overline{CGI} + MRQ*AGI*CGI + ARB*MRQ \quad (4)$$

$$ZBUS = \overline{ARB*CGI} + \overline{ARB*BC0*BC1*AGI} + \overline{ARB*MRQ} + BC1*\overline{MRQ}*\overline{CGI} + BC1*\overline{MRQ}*\overline{CGI} + BC0*\overline{MRQ}*\overline{CGI} \quad (5)$$

$$AGO = BC0*BC1*AGI + ARB*BC0 \quad (6)$$

$$CGO = \overline{ARB*BC0*BC1*AGI*CGI} + \overline{ARB*MRQ}*CGI + ARAB*BC1*\overline{MRQ} + ARB*BC0*\overline{MRQ} \quad (7)$$

The block labeled ARBITRATION LOGIC of FIG. 2 should implement equations 2 through 7. The implementation of boolean equations is straight forward, and may be done using NAND gates, NOR gates, PLA's, etc.

In the preferred embodiment, all processors will power-up in the LK state. A designated processor will also have the arbitration token (ARB is one) on power-up.

The remaining processors power up without the arbitration token. The box labelled INITIALIZATION in FIG. 2 determines in which state a processor powers up. There must be some systemwide control for designating which processor will power up having the arbitration token, which can be implemented using any of the variety of known techniques. The designated processor will go through its power-up sequence, which may involve self-check, initializing registers, etc. When the power-up sequence is completed, the designated processor will change to the CM or CS state, which will have the effect of passing arbitration to the next processor. The next processor, still in the LK state, will then undergo its initialization sequence. In this manner, each processor goes through its initialization sequence having exclusive bus access, and all processors complete the initialization sequence before any processor begins normal processing. It will be apparent that numerous other power-up schemes may easily be implemented.

TECHNICAL ADVANTAGES

A distributed arbitration scheme has been shown for multi-processor system. It has numerous advantages, including small pin count for the arbitration signal ring. This system also allows dynamic software control of arbitration states, so that relative access to the bus of various processors can change during program execution. In normal modes, all processors have fair access to the bus.

Arbitration control responsibility can be moved among the various processors, and is separated from bus access. Both bus access and arbitration mastership are determined every clock cycle. This scheme allows all processors to be fully pipelined, and can yield 100% bus utilization.

The present invention has been illustrated by the circuitry described above, and it will become apparent to those skilled in the art that various modifications and alterations may be made thereto. Such variations fall within the spirit of the present invention, the scope of which is defined by the appended claims.

What is claimed is:

1. A system for providing bus arbitration for at least two processors having a common clock signal, comprising:
    an asynchronous arbitration signal line connecting the processors into a ring;
    an asynchronous cycle grant signal line connecting the processors into a ring;
    arbitration control means located in each processor and coupled to said arbitration signal line for determining which processor will control arbitration for bus access on a following clock cycle, wherein said control means includes
        means for selecting an arbitration state of said control means;
        means for storing a bit indicating whether the processor has arbitration mastership; and
        logic means coupled to said asynchronous signal line, to said arbitration state selecting means, and to said bit storing means, for determining whether the processor will take arbitration mastership during the next cycle;
    cycle grant control means in each processor and coupled to said cycle grant signal line for determining which processor will have bus access on the following clock cycle.

2. The system of claim 1, wherein said arbitration control means is controlled by the state of at least one switch selectable by the processor.

3. The system of claim 2, wherein determination of next cycle arbitration is independent of determination of next cycle bus access.

4. The system of claim 1, wherein said arbitration and cycle grant control means operate on every clock cycle.

5. The system of claim 1, wherein said bit storing means comprises a state register.

6. The system of claim 1, wherein said arbitration state selecting means comprises a register coupled to the processor which can be changed during operation of the processor.

7. The system of claim 6, wherein said register has 2 bits defining four arbitration states, and wherein:
    the first state causes the processor to take arbitration mastership and lock the bus for exclusive access;
    the second state causes the processor to retain arbitration mastership, and grant bus access to another processor for each cycle in which bus access is not needed;
    the third state causes the processor to refuse arbitration mastership to another processor; and,
    the fourth state causes the processor to refuse arbitration mastership, and take needed bus access where available.

8. The system of claim 7, wherein all processors are set into the first arbitration state when the system is powered up.

* * * * *